United States Patent [19]
Duffy et al.

[11] Patent Number: 5,202,137
[45] Date of Patent: Apr. 13, 1993

[54] METHOD OF INHIBITING FAT AND OIL MIGRATION FROM AN OILY SUBSTRATE OF A FOOD PRODUCT INTO A COATING LAYER OF A FOOD PRODUCT

[75] Inventors: Brian F. Duffy, North Wales; Susan M. Grillo, Quakertown; Angela B. Tarpey, Lansdale, all of Pa.

[73] Assignee: Berwind Pharmaceutical Services, Inc., West Point, Pa.

[21] Appl. No.: 546,582

[22] Filed: Jun. 29, 1990

[51] Int. Cl.$^5$ .............................................. A23P 1/08
[52] U.S. Cl. ...................................... 426/89; 426/302; 106/218
[58] Field of Search ............... 426/103, 93, 98, 138, 426/306, 308, 309, 293, 438, 94, 101, 99, 303, 659, 660, 302, 89; 106/218

[56] References Cited

U.S. PATENT DOCUMENTS

| | | |
|---|---|---|
| 3,471,304 | 10/1969 | Hamdy ................................... 426/93 |
| 3,622,352 | 11/1971 | Daylor .................................. 426/303 |
| 3,741,795 | 6/1973 | Signorino ............................... 426/93 |
| 4,661,359 | 4/1987 | Seaborne ............................... 426/89 |
| 4,710,228 | 12/1987 | Seaborné ............................... 426/89 |
| 4,753,790 | 6/1988 | Silva ..................................... 426/303 |
| 4,810,534 | 3/1989 | Seaborne ............................... 426/89 |
| 4,820,533 | 4/1989 | Seaborne ............................... 426/106 |
| 4,874,618 | 10/1989 | Seaborne ............................... 426/115 |

Primary Examiner—Carolyn Paden
Attorney, Agent, or Firm—John F. A. Earley; John F. A. Earley, III

[57] ABSTRACT

A method of inhibiting fat and oil migration from an oily substrate of a food product into a coating layer of a food product, comprises the steps of mixing a shellac solution and an alcohol together to form a barrier coating solution, coating the oily substrate of the food product with an effective amount of the barrier coating solution to form a barrier coating layer of film surrounding the oily substrate, and covering the barrier coating layer of film with a coating layer of a food product.

57 Claims, No Drawings

METHOD OF INHIBITING FAT AND OIL MIGRATION FROM AN OILY SUBSTRATE OF A FOOD PRODUCT INTO A COATING LAYER OF A FOOD PRODUCT

BACKGROUND OF THE INVENTION

1. Field of the Invention

This invention is in the field of controlling fat and oil migration in food products, and is specifically concerned with controlling the migration of fat and oil in food products by inhibiting fat and oil migration between an oily substrate of a food product into a coating layer of a food product by providing a barrier film coating. Further, this invention is specifically concerned with controlling the migration of fats and oils in food products by inhibiting fat and oil migration into a substrate of a food product from an oily coating layer of a food product by providing a barrier film coating.

2. Description of the Prior Art

Controlling fat and oil migration in food products such as in confectionery items is desirable since the fats and oils which migrate from an oily substrate into the coating layer of the food product combine with components in the coating layer of the food product many times forming a foul taste.

For example, in a chocolate coated peanut, the oils and fats from the peanut can migrate into the chocolate coating, and the combining of the oils and fats from the peanut with the chocolate coating often results in a foul taste.

Controlling the migration of oils and fats by matrixing or entraining the oils and fats with other solid or semi-solid lipid components, as discussed in "Monitoring And Controlling Oil Migration In Peanut Butter Confections", by John J. Shuleva in the May 1989 issue of *The Manufacturing Confectioner* (pages 72–74), which is incorporated herein by reference, results many times in a change in the original taste of the fat and oil containing component, and this is undesirable.

SUMMARY OF THE INVENTION

A barrier coating solution for forming a barrier film coating for inhibiting fat and oil migration from an oily substrate of a food product into a coating layer of a food product and for inhibiting fat and oil migration into a substrate of a food product from an oily coating layer of a food product comprises a shellac solution mixed into an alcohol, which may be applied to the substrate to form a barrier film coating surrounding the substrate. A plasticizer may be added to the barrier coating solution before the coating step.

The film former of the coating is a shellac solution. Exemplary of the shellac solution is a shellac 6 pound(lb.) cut that is made by dissolving shellac in SD-45 grade alcohol or in SDA-45A alcohol. Alternatively, a shellac 4 lb. cut solution or a shellac 8 lb. cut solution may be used. Such shellac solutions are made by Zinsser & Mantrose-Haeuser (for example, Mantrose-Haeuser's 6# refined pharmaceutical glaze NF in SD-45 alcohol (200 proof)).

The alcohol of the coating solution may be, for example, SDA-35A alcohol, such as that manufactured by Devon, 3A alcohol, or any food grade alcohol. The alcohol of the coating solution is used to cut or reduce the viscosity of the shellac solution, as well as to act as an extender or thinner for thinning the shellac so that an even film thickness may be obtained.

The plasticizer may be an acetylated monoglyceride, such as Myvacet 945 made by Eastman Kodak, polyethylene glycol, such as PEG 400 made by Union Carbide, triethyl citrate, such as Triacetin made by Eastman Kodak, or a combination of these plasticizers.

The quantity of the shellac solution is within a range of 30% to 70% by weight of the coating solution, and preferably is within a range of 40% to 55% by weight of the coating solution.

The quantity of the alcohol is within a range of 30% to 70% by weight of the coating solution, and preferably is within a range of 40% to 50% by weight of the coating solution.

The range for the plasticizer is 0% to 15% by weight of the coating solution, and the preferred range of the plasticizer is 3% to 7% by weight of the coating solution.

DETAILED DESCRIPTION

The following examples of the invention all disclose formulations which may be mixed together to form a coating solution effective to coat a substrate of a food product with a barrier coating layer of film, the barrier coating layer of film acting as a fat barrier for inhibiting fat and oil migration.

The food products include peanuts enrobed in a chocolate compound coating, chocolate pieces coated with a white chocolate compound coating, confectioneries such as those having a cream fondant and coconut center that are coated with a chocolate compound coating, and bakery products such as a cookie wafer enrobed with a chocolate compound coating.

EXAMPLES

The following examples illustrate the invention. All units and percentages used herein are by weight.

EXAMPLE 1

A barrier coating solution is made for coating peanuts to inhibit fat and oil migration from the peanuts into a subsequently applied chocolate coating layer surrounding the peanuts. The following ingredients are mixed together to form the coating solution.

|  | Percent | Grams |
|---|---|---|
| SHELLAC 6 LB IN SD-45 ALCOHOL | 48.5 | 12.0 |
| SDA 35A ALCOHOL | 45.2 | 11.2 |
| MYVACET 945 | 3.3 | 0.80 |
| PEG 400 | 3.0 | 0.74 |
|  | 100 | 24.74 |

SDA-35A alcohol is a food grade alcohol made by Devon. Myvacet 945 is an acetylated monoglyceride, a plasticizer, made by Eastman Kodak, and PEG 400 is polyethylene glycol, a plasticizer, made by Union Carbide.

The coating solution is prepared by blending the ingredients of the above formula in a blender at high speed until all ingredients are well blended. A medium yellow solution results.

A 700 gram charge of unroasted, unsalted peanuts is spray coated in an Aeromatic fluidized bed coater with a 1.1 mm fluid nozzle. The operator places the peanuts in the bed coater, and starts the turbine of the bed coater to fluidize the peanuts. The peanuts are sprayed with the barrier coating solution having a 28.3% solids level. The spray coating parameters are inlet temperature 40° C., outlet temperature 25° C., atomizing air 2 bar, and feed rate 12 grams per minute. A weight gain of approximately 1.0% is obtained, with approximately 7 grams of dried coating covering the peanuts.

The barrier coated dried peanuts are then coated or enrobed in a chocolate compound coating using a Hilliards hand coater system and placed in a Hilliards cooling cabinet at 65° F.

We have found no unpleasant organoleptic characteristics in the finished product.

EXAMPLE 2

Six kilograms of chocolate pieces are placed in a 16 inch conventional coating pan and rotated at 16 RPM. The chocolate pieces are warmed at a temperature no higher than their melting temperature (this temperature varies with different types of chocolates) to smooth the surface of the chocolate pieces. Then, the heat is turned off and cool air is introduced into the pan. Slowly, 212 grams of a barrier coating solution having a 28.3% solids level and having the following formula, which is mixed together as in Example 1, are ladled over the chocolate pieces in four applications of approximately 50 grams each. Between each application of the barrier coating solution, the chocolate pieces are allowed to thoroughly dry. A weight gain of approximately 1.0% is applied, with approximately 60 grams of the dry barrier coating layer being retained on the chocolate pieces.

|  | Percent | Grams |
| --- | --- | --- |
| SHELLAC 6 LB IN SD-45 ALCOHOL | 48.5 | 102.82 |
| SDA 35A ALCOHOL | 45.2 | 95.82 |
| MYVACET 945 (KOSHER) | 3.3 | 7.00 |
| PEG 400 | 3.0 | 6.36 |
|  | 100 | 212 |

The coated chocolate pieces are then hand dipped in a melted white chocolate compound coating and are placed in a Hilliards cooling cabinet at 65° F. to dry.

EXAMPLE 3

A barrier coating solution is made as in Example 1 having the following formula:

|  | Percent | Grams |
| --- | --- | --- |
| SHELLAC 6 LB IN SDA-45A ALCOHOL | 48.5 | 17.1 |
| SDA 35A ALCOHOL | 45.2 | 16.0 |
| MYVACET 945 (KOSHER) | 3.3 | 1.2 |
| PEG 400 | 3.0 | 1.0 |
|  | 100 | 35.3 |

A confectionery center comprising cream fondant and coconut, having a consistency that can be panned, is formed into spherical balls having approximately one inch diameters. A kilogram of these spherical balls of confectionery center is placed on a 12 inch conventional coating pan and rotated at 8 rotations per minute (RPM). Cool drying air is introduced into the coating pan and the barrier coating solution is sprayed onto the spherical balls of confectionery center using a #460 Binks air gun, nozzle K690 SS × K92P. The barrier coating solution is sprayed at 10 grams per minute, and a weight gain of approximately one percent is applied. Approximately 10 grams of dried barrier coating layer covers the centers.

The centers are then placed into a Hilliards cooling cabinet to dry fully before being coated or enrobed with a chocolate coating compound using a Hilliards hand coating system. After being coated with the chocolate coating compound, the chocolate coated centers are placed in a cooling cabinet to fully dry at 65° F.

EXAMPLE 4

A barrier coating solution is made as in Example 1 using the following formula:

|  | Percent | Grams |
| --- | --- | --- |
| SHELLAC 6 LB IN SDA-45A ALCOHOL | 48.5 | 2.74 |
| SDA 35A ALCOHOL | 45.2 | 2.55 |
| MYVACET 945 (KOSHER) | 3.3 | .19 |
| PEG 400 | 3.0 | .17 |
|  | 100 | 5.65 |

The barrier coating solution is sprayed onto 200 grams of graham cracker wafers by air brushing until a thin wet film appears on the graham cracker wafers. The film is dried quickly by introducing cool drying air onto the wafers. Then, the wafers are turned over and sprayed again with the barrier coating solution by air brushing until a thin wet film appears. This film is also dried quickly by introducing cool drying air onto the wafers. A weight gain of approximately 0.8% is obtained, with approximately 1.6 grams of the dry barrier coating layer being retained on the wafers. The weight gain is measured by weighing the wafers before and after the barrier coating layer of film is applied.

The wafers are then coated or enrobed with a chocolate compound coating and cooled in a cooling cabinet at 65° F.

The graham cracker wafers are made by Sunshine Co.

By coating the graham cracker wafer with a barrier coating layer of film, oils and fats from the subsequently applied chocolate compound coating are inhibited from migrating into the graham cracker wafer. The barrier coating layer of film inhibits migration of fats and oils past it.

ADVANTAGES

By coating an oily based substrate of a food product with a barrier coating layer of film, and then covering the barrier coating layer of film with a coating layer of the food product, the migration of fats and oils from the oily substrate into the coating layer of the food product is inhibited. Accordingly, since the oils and fats are inhibited from migrating past the barrier coating of film, foul taste caused by the mixing of the fats and oils from the substrate with components outside the oily substrate is avoided.

By coating a substrate of a food product with a barrier coating layer of film, and then covering the barrier coating layer of film with an oily coating layer of the food product, the migration of fats and oils from the oily coating layer into the substrate of the food product is inhibited. Accordingly, since the oils and fats are inhibited from migrating past the barrier coating of film, foul taste caused by the mixing of the fats and oils of the oily coating layer with components inside the substrate is avoided.

With food products, such as chocolate pieces having a chocolate coating, the barrier coating of film surrounding the chocolate substrate of the chocolate piece not only inhibits the migration of fats and oils from the chocolate substrate into its chocolate coating, but the barrier coating of film inhibits the migration of fats and oils from the chocolate coating into the chocolate substrate. Accordingly, foul taste caused by the mixing of fats and oils of one section of the chocolate piece with components of another section of the chocolate piece is avoided.

Further, using the inventive method, rather than controlling oil and fat migration by matrixing or entraining the oils and fats with other solid or semi-solid lipid components, the original tastes of the substrate component of the food product and of the coating layer of the food product are maintained.

We claim:

1. A method of inhibiting fat and oil migration from a food product substrate having an oily component or an oily surface into a coating layer covering the food product substrate, comprising the steps of
   mixing a shellac solution and an alcohol together to form a barrier coating solution, the shellac solution being in a range of 30% to 70% by weight of the barrier coating solution, the alcohol being in a range of 30% to 70% by weight of the barrier coating solution,
   forming a barrier coating layer of film surrounding the oily food product substrate by coating the oily food product substrate with an effective amount of the barrier coating solution,
   covering the barrier coating layer of film with a coating layer, and
   inhibiting fat and oil migration from the food product substrate into the coating layer with the barrier coating layer of film.

2. The method of claim 1, further including mixing a plasticizer into the barrier coating solution.

3. The method of claim 2,
   the plasticizer being an acetylated monoglyceride, polyethylene glycol or triethyl citrate.

4. A food product produced by the method of claim 3.

5. The method of claim 2,
   the plasticizer being in a range of greater than 0% to 15% by weight of the coating solution.

6. A food product produced by the method of claim 5.

7. The method of claim 2,
   the plasticizer being in a range of 3% to 7% by weight of the coating solution.

8. A food product produced by the method of claim 7.

9. A food product produced by the method of claim 2.

10. The method of claim 1,
    the shellac solution including a shellac dissolved in alcohol prior to being mixed with more alcohol to form the barrier coating solution.

11. A food product produced by the method of claim 10.

12. The method of claim 1,
    the shellac solution being in a range of 30% to 70% by weight of the coating solution.

13. A food product produced by the method of claim 12.

14. The method of claim 1,
    the shellac solution being in a range of 40% to 55% by weight of the coating solution.

15. A food product produced by the method of claim 14.

16. The method of claim 1,
    the alcohol being suitable for food use.

17. A food product produced by the method of claim 16.

18. The method of claim 1,
    the alcohol being in a range of 30% to 70% by weight of the coating solution.

19. A food product produced by the method of claim 18.

20. The method of claim 1,
    the alcohol being in a range of 40% to 50% by weight of the coating solution.

21. A food product produced by the method of claim 20.

22. A food product produced by the method of claim 1.

23. A method of inhibiting fat and oil migration from a food product substrate having an oily component or an oily surface into a coating layer covering the food product substrate, comprising the steps of
    mixing a shellac solution, an alcohol, and a plasticizer together to form a barrier coating solution,
    forming a barrier coating layer of film surrounding the oily food product substrate by coating the substrate of the food product with an effective amount of the barrier coating solution,
    covering the barrier coating layer of film with a coating layer, and
    inhibiting fat and oil migration from the food product substrate into the coating layer covering the food product substrate with the barrier coating layer of film,
    the shellac solution including a shellac dissolved in alcohol prior to being mixed with more alcohol and the plasticizer,
    the shellac solution being in a range of 40% to 55% by weight of the coating solution,
    the alcohol being suitable for food use,
    the alcohol being in a range of 40% to 50% by weight of the coating solution,
    the plasticizer being an acetylated monoglyceride, polyethylene glycol or triethyl citrate, and
    the plasticizer being in a range of 3% to 7% by weight of the coating solution.

24. A food product produced by the method of claim 23.

25. A method of inhibiting fat and oil migration into a substrate of a food product from an oily coating layer of a food product, comprising the steps of
    mixing a shellac solution and an alcohol together to form a barrier coating solution, the shellac solution being in a range of 30% to 70% by weight of the barrier coating solution, the alcohol being in a range of 30% to 70% by weight of the barrier coating solution,
    forming a barrier coating layer of film surrounding the substrate by coating the substrate of the food product with an effective amount of the barrier coating solution,
    covering the barrier coated coating layer of film with an oily coating layer of a food product, and
    inhibiting fat and oil migration into the substrate of the food product from the oily coating layer of the food product with the barrier coating layer of film.

26. The method of claim 25, further including mixing a plasticizer into the coating solution.

27. The method of claim 26, the plasticizer being an acetylated monoglyceride, polyethylene glycol or triethyl citrate.

28. A food product produced by the method of claim 27.

29. The method of claim 26, the plasticizer being in a range of greater than 0% to 15% by weight of the coating solution.

30. A food product produced by the method of claim 29.

31. The method of claim 26, the plasticizer being in a range of 3% to 7% by weight of the coating solution.

32. A food product produced by the method of claim 31.

33. A food product produced by the method of claim 26.

34. The method of claim 25, the shellac solution including a shellac dissolved in alcohol prior to being mixed with more alcohol to form the barrier coating solution.

35. A food product produced by the method of claim 34.

36. The method of claim 25, the shellac solution being in a range of 30% to 70% by weight of the coating solution.

37. A food produce produced by the method of claim 36.

38. The method of claim 25, the shellac solution being in a range of 40% to 55% by weight of the coating solution.

39. A food produced by the method of claim 38.

40. The method of claim 25, the alcohol being suitable for food use.

41. A food product produced by the method of claim 40.

42. The method of claim 25, the alcohol being in a range of 30% to 70% by weight of the coating solution.

43. A food product produced by the method of claim 42.

44. The method of claim 25, the alcohol being in a range of 40% to 50% by weight of the coating solution.

45. A food product produced by the method of claim 44.

46. A food product produced by the method of claim 25.

47. A method of inhibiting fat and oil migration into a substrate of a food product from an oily coating layer of a food product, comprising the steps of
mixing a shellac solution, an alcohol, and a plasticizer together to form a barrier coating solution,
forming a barrier coating layer of film surround the substrate by coating the substrate of the food product with an effective amount of the barrier coating solution,
covering the barrier coated coating layer of film with an oily coating layer of a food product, and
inhibiting fat and oil migration into the substrate of the food product from the oily coating layer of the food product with the barrier coating layer of film,
the shellac solution including a shellac dissolved in alcohol prior to being mixed with more alcohol and the plasticizer,
the shellac solution being in a range of 40% to 55% by weight of the coating solution,
the alcohol being suitable for food use,
the alcohol being in a range of 40% to 50% by weight of the coating solution,
the plasticizer being an acetylated monoglyceride, polyethylene glycol or triethyl citrate, and
the plasticizer being in a range of 3% to 7% by weight of the coating solution.

48. A food product produced by the method of claim 47.

49. A method of inhibiting fat and oil migration from an oily peanut substrate of a chocolate coated peanut into a chocolate coating layer of the chocolate coated peanut, comprising the steps of
mixing a shellac solution, an alcohol, and a plasticizer together to form a barrier coating solution,
coating the oily peanut substrate of the chocolate coated peanut with an effective amount of the barrier coating solution to form a barrier coating layer of film surrounding the oily peanut substrate, and
covering the barrier coating layer of film with the chocolate coating layer of the chocolate coated peanut.

50. A method of inhibiting fat and oil migration from a chocolate substrate of a chocolate piece coated with a white chocolate compound coating into the white chocolate compound coating, comprising the steps of
mixing a shellac solution, an alcohol, and a plasticizer together to form a barrier coating solution,
coating the chocolate substrate with an effective amount of the barrier coating solution to form a barrier coating layer of film surrounding the chocolate substrate, and
covering the barrier coating layer of film with the white chocolate compound coating.

51. A method of inhibiting fat and oil migration between a cream fondant/coconut confectionery center substrate of a chocolate coated confectionery piece and a chocolate coating of a chocolate coated confectionery piece, comprising the steps of
mixing a shellac solution, an alcohol, and a plasticizer together to form a barrier coating solution,
coating the confectionery substrate with an effective amount of the barrier coating solution to form a barrier coating layer of film surrounding the confectionery substrate, and
covering the barrier coating layer of film with the chocolate coating.

52. A method of inhibiting fat and oil migration into a cookie wafer substrate of a chocolate coated cookie wafer from a chocolate coating layer of the chocolate coated cookie wafer, comprising the steps of
mixing a shellac solution, an alcohol, and a plasticizer together to form a barrier coating solution, the shellac solution being in a range of 30% to 70% by weight of the barrier coating solution, the alcohol being in a range of 30% to 70% by weight of the barrier coating solution,
forming a barrier coating layer of film surrounding the cookie wafer substrate by coating the cookie wafer substrate with an effective amount of the barrier coating solution,
covering the barrier coating layer of film with the chocolate layer, and
inhibiting fat and oil migration into the cookie wafer substrate form the chocolate coating layer with the barrier coating layer of film.

53. A method of inhibiting fat and oil migration from a food product substrate having an oily component or an oily surface into a coating layer covering the food product substrate, comprising the steps of forming a barrier coating solution using the step consisting essentially of mixing a shellac solution and an alcohol together, coating the oily food product substrate with an effective amount of the barrier coating solution to form a barrier coating layer of film surrounding the oily food product substrate, and covering the barrier coating layer of film with a coating layer.

54. The method of claim 53, further including mixing a plasticizer with the shellac solution and the alcohol to form the barrier coating solution.

55. A method of inhibiting fat and oil migration into a substrate of a food product from an oily coating layer of a food product, comprising the steps of forming a barrier coating solution using the step consisting essentially of mixing a shellac solution and an alcohol together, coating the substrate of the food product with an effective amount of the barrier coating solution to form a barrier coating layer of film surrounding the substrate, and covering the barrier coated coating layer of film with an oily coating layer of a food product.

56. The method of claim 55, further including mixing a plasticizer with the shellac solution and the alcohol to form the barrier coating solution.

57. A method of inhibiting fat and oil migration into a cookie wafer substrate of a chocolate coated cookie wafer from a chocolate coating layer of the chocolate coated cookie wafer, comprising the steps of forming a barrier coating solution using the step consisting essentially of mixing a shellac solution, an alcohol, and a plasticizer together, coating the cookie wafer substrate with an effective amount of the barrier coating solution to form a barrier coating layer of film surrounding the cookie wafer substrate, and covering the barrier coating layer of film with the chocolate layer.

* * * * *